(12) United States Patent
Rinderer

(10) Patent No.: US 8,403,289 B1
(45) Date of Patent: Mar. 26, 2013

(54) UNIVERSAL ELECTRIC BOX MOUNTING DEVICE

(76) Inventor: Eric R. Rinderer, Nashville, TN (US)

( * ) Notice: Subject to any disclaimer, the term of this patent is extended or adjusted under 35 U.S.C. 154(b) by 491 days.

(21) Appl. No.: 12/574,941

(22) Filed: Oct. 7, 2009

Related U.S. Application Data

(60) Provisional application No. 61/105,610, filed on Oct. 15, 2008.

(51) Int. Cl.
| A47F 5/00 | (2006.01) |
| A47H 1/10 | (2006.01) |
| F16M 11/00 | (2006.01) |
| E04G 25/00 | (2006.01) |
| H02G 3/08 | (2006.01) |
| H01J 5/00 | (2006.01) |
| H01J 15/00 | (2006.01) |
| H02B 1/40 | (2006.01) |

(52) U.S. Cl. ..... 248/906; 248/300; 248/200; 248/298.1; 248/200.1; 220/3.5; 220/3.6; 220/3.9; 220/3.2; 220/3.3; 174/50; 174/60; 174/53; 174/58; 174/480; 174/61; 174/62; 174/63

(58) Field of Classification Search ............... 248/217.4, 248/906, 300, 200, 205.7, 343, 298.1, 200.1; 220/3.5–3.6, 3.9, 3.2, 3.3; 174/50, 48, 53, 174/58, 57, 480, 60–63
See application file for complete search history.

(56) References Cited

U.S. PATENT DOCUMENTS

| 4,399,922 | A | 8/1983 | Horsley | |
|---|---|---|---|---|
| 4,688,693 | A | 8/1987 | Medlin, Jr. | |
| 4,757,967 | A | 7/1988 | Delmore et al. | |
| 4,943,022 | A | 7/1990 | Rinderer | |
| 4,964,525 | A * | 10/1990 | Coffey et al. | 220/3.9 |
| 4,967,990 | A | 11/1990 | Rinderer | |
| 5,263,676 | A * | 11/1993 | Medlin et al. | 248/300 |
| 5,330,137 | A | 7/1994 | Oliva | |
| 5,595,362 | A | 1/1997 | Rinderer et al. | |
| 5,927,667 | A | 7/1999 | Swanson | |
| 5,931,425 | A | 8/1999 | Oliva | |
| 6,666,419 | B1 | 12/2003 | Vrame | |
| 6,871,827 | B2 | 3/2005 | Petak et al. | |
| 7,053,300 | B2 * | 5/2006 | Denier et al. | 174/58 |
| 7,439,443 | B2 * | 10/2008 | Dinh | 174/58 |
| 7,472,875 | B2 | 1/2009 | Rinderer | |
| 8,042,776 | B2 * | 10/2011 | Johnson | 248/200.1 |
| 2003/0205654 | A1 * | 11/2003 | Petak et al. | 248/300 |
| 2005/0067546 | A1 | 3/2005 | Dinh | |
| 2006/0005987 | A1 * | 1/2006 | Denier et al. | 174/58 |
| 2007/0187402 | A1 * | 8/2007 | Dinh | 220/3.9 |
| 2008/0029287 | A1 * | 2/2008 | Korcz et al. | 174/58 |

* cited by examiner

*Primary Examiner* — Terrell McKinnon
*Assistant Examiner* — Christopher Garft
(74) *Attorney, Agent, or Firm* — Waddey & Patterson, P.C.; Phillip E. Walker; Gary L. Montle

(57) ABSTRACT

A universal bracket is provided for mounting electrical boxes. The bracket includes a generally rectangular first plate having at least one aperture defined within the first plate. The aperture is shaped to provide access to an electrical box mounted to the first plate, and further includes first and second pairs of diagonally opposite corners. A second plate extends rearward and substantially perpendicular to the first plate and located proximate a first side of the aperture. The first plate further includes one or more fastening portions and a plurality of mounting holes disposed about the fastening portions. One or more of the mounting holes are positioned for mounting the bracket to a vertical structural member adjacent either of two opposite sides of the bracket or a horizontal element adjacent a third side of the bracket, maintaining a particular bracket orientation.

17 Claims, 16 Drawing Sheets

UNIVERSAL ELECTRIC BOX MOUNTING DEVICE

CROSS-REFERENCES TO RELATED APPLICATIONS

This application claims benefit of the following patent application(s): U.S. Provisional Patent Application No. 61/105,610, filed on Oct. 15, 2008.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

BACKGROUND OF THE INVENTION

The present invention relates generally to electrical connection mounting. More particularly, the present invention relates to assemblies for mounting electric boxes to one or more wall studs. Even more particularly, this invention pertains to universal brackets upon which numerous types or depths of electric boxes may be mounted in various locations, and methods of performing the same.

Electric boxes are mounted upon walls to support electrical devices such as light switches, outlets or any other electrical device. Walls are generally formed against wooden or metal studs, although metal of a channel configuration is particularly common in modern residential and commercial applications. In such applications, electric boxes tend to be supported by assemblies, frames or brackets that are in turn mounted to the metal studs or to other components that rest directly on the floor. Many types of these assemblies, frames or brackets have been in use for more than thirty years.

The electric boxes are supported in many fashions. They may be fastened directly to a wall stud, albeit this method is generally discouraged on metal studs for practical reasons. They may rest within a bracket that attaches along one side to a vertical wall stud. They may rest within a bracket that extends between and is attached to two vertical wall studs. They may also be supported by a different bracket resting directly on the floor and not making contact with a wall stud at all. Traditional methods of mounting such electric boxes therefore require electricians or the like to maintain a complete stock of each type of mounting bracket that may be necessary as the situation demands.

Another difficulty that arises is the need to physically attach each electric box to the appropriate mounting bracket in the field. In many applications, the electric box may not be permanently attached until after the mounting bracket is in place on the wall stud, and the electric box in such situations will often become partially or completely dislodged from the bracket. These burdensome and time-consuming efforts are in addition to the subsequent requirement of fastening a faceplate, or plaster ring, onto the electric box for permanent attachment. Certain aspects of the prior art have attempted to address this problem with locking devices that extend from the front of a mounting bracket to engage an electrical box and prevent such movement. However, these locking devices have only been effective for boxes of a particular size and are therefore impractical for a desired universal application. These locking devices are in many cases further impractical because a user cannot install an electrical box and lock it into place after the bracket has already been screwed into a structural member. Other examples of locking devices address these previous problems, but undesirably obstruct clearance holes for fastening screw heads and impede progress of fastening screws through the front plate of a mounting bracket.

New methods of wiring buildings now require that many electrical boxes arrive at a building construction site prefabricated. As such, many electric boxes now come to the building construction site already connected within a mounting bracket, with devices installed and with wire connections already in place. However, this method still requires complex specifications to be made for pre-fabrication prior to assembly and delivery to the construction site. Some examples of the details that must be considered in determining the proper mounting bracket include: the spacing of the wall studs (typically 16" or 24", but in practice anywhere from 3" to 24"); the depth of the electric boxes ($1\frac{1}{2}$" to $3\frac{1}{2}$"); the square dimension of the box (4"×4" or $4\frac{11}{16}$"×$4\frac{11}{16}$"); the desired location of the box either on a stud or suspended between two studs; if the desired location is between two studs, is the box to be mounted in a random or specified location; the number and depth of boxes to be mounted between studs; and the height above the floor (12", 15" or 18").

The prior art in pre-fabricated electric box assemblies, including mounting brackets, has only tended to address individual issues from the group described above. For example, certain brackets have been developed for electric boxes of a particular size but are generally not used for other applications. Certain other mounting devices have been developed for mounting electric boxes of any depth between two wall studs, but these devices are also used only in particular applications. Quite literally dozens of devices are therefore available to address each conceivable variation of conditions. This variety of solutions is available at the expense of a great deal of time and money required to manufacture, ship, sort through, specify and install each of these devices as needed. Obviously, the mounting devices as known in the prior art have not been conducive to flexibility in the field, where the circumstances required for installing the box at the specified locations are generally unknown until the time of actual installation at the building construction site. Maximum flexibility is most critical when electrical boxes must be prefabricated, as is frequently the case.

Another current problem that is not adequately addressed by the prior art is an efficient and inexpensive height setting device for mounting electrical boxes. Currently, an electrician or the like must often measure distances from the floor by hand. This is undesirable in that human error is inherently possible. While prior art non-measurement height setting means have been developed, they only have a single application and are therefore undesirable and prohibitively expensive.

Therefore, it would be desirable to replace each of the dozens of currently available solutions by providing a mounting device that could universally be applied to each potential application, whether on-site or prefabricated, and without regards to each of the details that must be considered in the field when selecting a device.

It would be further desirable to provide a mounting device that could in a single orientation mount an electric box of various sizes or dimensions in various desired fashions or locations.

It would be further desirable to provide a single mounting bracket that could accommodate one or more electric boxes and still in a single orientation mount the boxes in any desired location, or to provide a plurality of mounting brackets that could easily be combined to accommodate the same one or more electric boxes in the same fashion.

It would be even further desirable to provide a mounting bracket that could substantially prevent an electric box from slipping or becoming dislodged from a desired position prior to permanent fastening of the box to the bracket, regardless of whether or not the bracket has already been fastened to a wall stud.

It would be even further desirable to provide a universal device having height setting means for consistently mounting electrical boxes a desired distance from a floor or from a ceiling, without requiring hand measurement by an electrician or the like.

BRIEF SUMMARY OF THE INVENTION

A universal electric box mounting device in accordance with the present invention is provided to permit the mounting of one or more electric boxes of various types or depths to variably spaced wooden or metal structural members and at any code-compliant height, as well as to elements horizontally disposed between two such structural members.

The mounting device in one aspect includes a bracket with a first plate to which the electric box is mounted using screws or other equivalent structures through a plurality of apertures in the first plate such as for example keyholes. A second plate is attached to the first plate and extends rearward and substantially perpendicular from the first plate. The bracket contains one or more mounting portions integral to or extending from the first plate and having mounting holes through which screws or other equivalent structures may attach the bracket to a structural member.

The mounting holes are positioned such that the bracket in a single orientation can be attached to a vertical wall stud adjacent a first edge of the bracket, attached to a second vertical wall stud adjacent a second edge of the bracket, attached to a horizontal spanner bar adjacent a third edge of the bracket, or attached to a horizontal spanner bar adjacent a fourth edge of the bracket.

The present invention as described further presents an improved method of holding the electric box in place prior to installation of a faceplate or plaster ring, as well known to those familiar in the art. As the bracket may be used in one preferred orientation for all applications, gravity alone may therefore serve to hold the electric box in place and therefore the user does not have to endure the logistical frustrations present in many existing prior art devices.

In another aspect of the present invention, the mounting device may have overlap tabs extending from the second plate and to either side of the bracket. The overlap tabs may be configured to overlap with second plates on adjacent mounting brackets, such that the devices may be supportably connected together in series.

In another aspect of the present invention, the mounting device may further improve upon the prior art by providing locking tabs attached to the second plate. The locking tabs are flexible about at least one axis between a parallel configuration relative to the second plate and a position of attachment with an electric box positioned against the bracket. The tabs may therefore fold into place after the electric box is positioned against the bracket and prior to fastening of the electric box to the bracket, to further prevent slippage or disengagement of the electric box from the bracket.

In another aspect of the present invention, the spanner bar may be vertically positioned to provide a height setting mechanism for locating a desired vertical position with respect to a floor or ceiling for mounting an electrical box. The spanner bar is easily maneuvered between a vertical position for measuring and establishing a vertical distance, and a horizontal position for actual mounting of the bracket and the associated electrical box at a desired vertical height.

In an embodiment of the present invention as described, a bracket is provided for mounting one or more electrical boxes within a wall cavity, with each such electric box having side walls, a rear wall and a front opening collectively defining an interior. The bracket includes a first generally rectangular plate portion. At least one aperture is defined within the first plate portion and has a first pair of substantially parallel sides and a second pair of substantially parallel sides. The aperture is further shaped to permit access to the electrical box interior. At least three sides of the aperture also define at least three mounting planes oriented perpendicular to the first plate portion. The bracket further includes a second plate portion extending rearward and substantially perpendicular from the first plate portion proximate one side of the aperture. A plurality of mounting tabs extend from the first plate portion, and a plurality of mounting holes are disposed among the mounting tabs and the first plate portion, with one or more mounting holes located opposite the aperture with respect to each of the defined mounting planes.

In another embodiment of the present invention, a bracket is provided for mounting one or more electrical boxes within a wall cavity. Each electrical box for use with the bracket has side walls, a rear wall, and a front opening collectively defining an interior, and one or more pairs of screws projecting forward from the box generally adjacent diagonally opposite corners of the front opening, with each screw having a screw head and a threaded shank. The bracket includes a first plate having at least one aperture shaped to permit access to the electrical box interior. The first plate has first and second pairs of diagonally opposite corners, and one or more fastening portions configured to engage an exterior face of the structural members. A second plate extends rearward and substantially perpendicular to the first plate proximate one side of the aperture. At least one pair of screw receiving formations is provided in the first plate generally adjacent at least one of the pairs of diagonally opposite corners of each aperture. The screw receiving formations have one end shaped to prevent passage of the screw heads through the formations along an orientation transverse to the first plate. The screw receiving formations are further configured to permit lateral passage of the threaded shanks from a first shank position wherein transverse passage of the screw heads is permitted to a second shank position associated with the formation end. These first and second positions for the shanks further define a first and second position of the electrical box with the screw heads so received. At least one locking tab is attached to the second plate, with the attachment defining an axis about which the tab may flex from an unlocked position (wherein the electrical box is permitted to laterally slide from the first position to the second position) to a locked position engaging the electrical box (wherein the electrical box is prevented from laterally sliding from the second position to the first position).

In another embodiment of the present invention, a bracket is provided for mounting electrical boxes. The bracket includes a generally rectangular first plate having at least one aperture defined within the first plate. The aperture is shaped to provide access to an electrical box mounted to the first plate, and further includes first and second pairs of diagonally opposite corners. A second plate extends rearward and substantially perpendicular to the first plate and located proximate a first side of the aperture. The first plate further includes one or more mounting portions and a plurality of mounting holes disposed about the mounting portions. One or more of the mounting holes are positioned for mounting the bracket to a vertical structural member adjacent either of two opposite sides of the bracket or a horizontal element adjacent a third side of the bracket, maintaining a particular bracket orientation.

DETAILED DESCRIPTION OF THE INVENTION

Figure 1A:
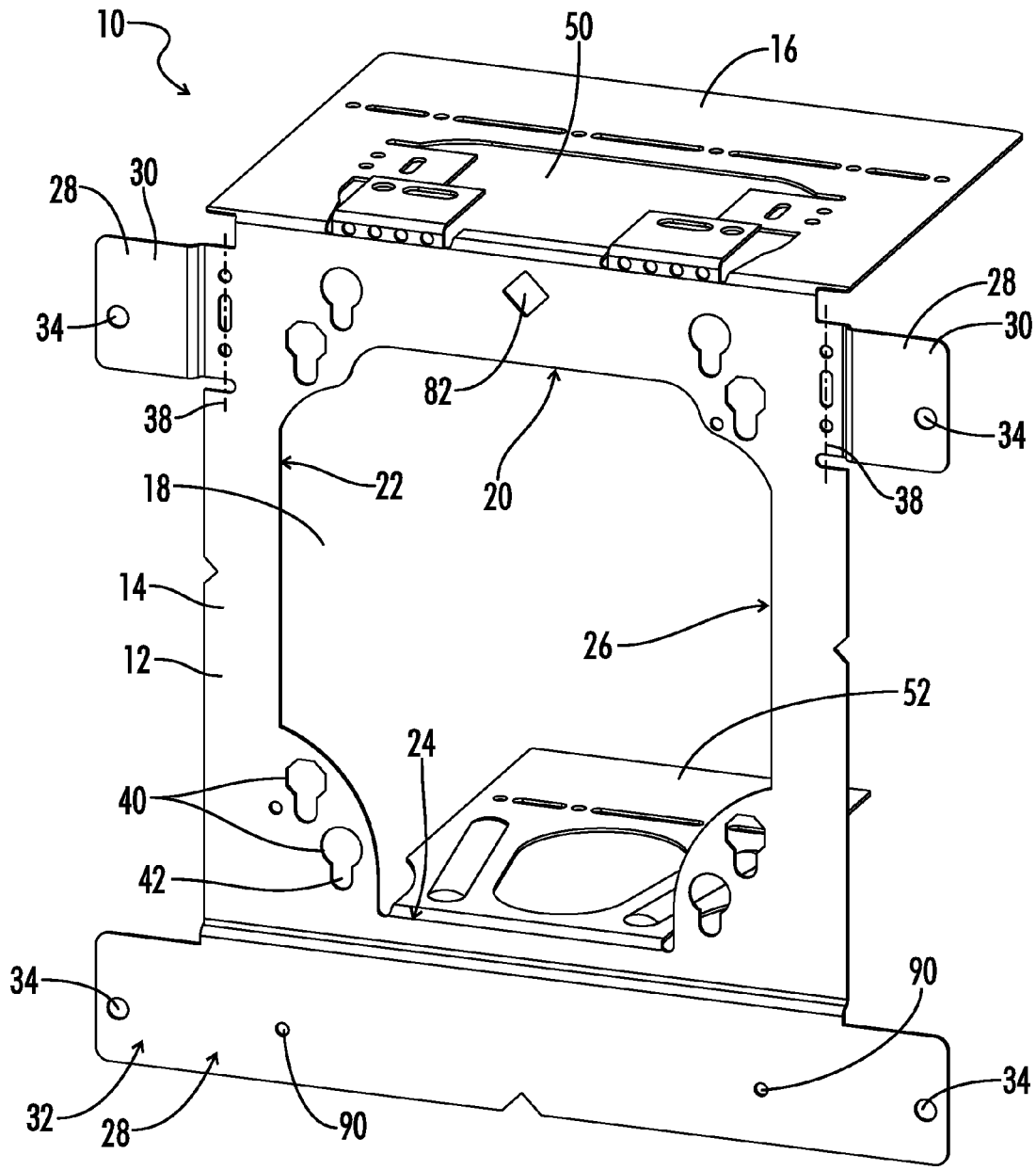
FIG. 1a is an isometric view of a mounting device of an embodiment of the present invention.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may. The term "plane" as used herein refers to an abstract reference plane or axis that may be locationally defined as collinear and/or coincident with a particular structure, but is not spatially limited thereby unless so specifically recited. The "orientation" of a bracket as used herein refers to the position of a particular portion of the bracket with respect to any other portion of the bracket, such as for example where a "top" and a "bottom" edge of the bracket may be defined, and may generally not be otherwise limiting on positioning of the bracket as a whole.

For the sake of clarity a mounting device in accordance with the present invention may hereafter be described from time to time with reference to a vertical structural member, such as for example a wall stud, having a first vertical plane of reference generally parallel to the vertical axis of the vertical structural member and coincident with a front face of the vertical structural member. While drywall may be placed with respect to either face of a structural member, the "front" of the vertical structural member may be referred to as including the portion of the member facing the drywall through which the mounting device of the present invention is accessible. The mounting device may be described as having a "top," a "bottom," a "left," or a "right" side with respect to the "front" face of the structural member when mounted. However, while a preferred universal orientation for the present invention may be shown and described herein with respect to the vertical structural member, it is in no way limiting on the functionality of the mounting device of the present invention, as it will be understood that the mounting device may be mounted in various alternative and equivalent fashions. Further, while the mounting device of the present invention is described as being capable of mounting to structures on various adjacent sides, it may be understood that the adjacent structures are not necessarily required components of the present invention unless specifically recited as such, but merely indicative of capabilities of the device.

Referring generally to FIGS. 1-18, a universal electric box mounting device in accordance with the present invention is herein described. The mounting device of the present invention is provided for mounting one or more electrical boxes within a wall cavity. Such electrical boxes are well known in the art and may be generally defined as having side walls, a rear wall, and a front opening collectively defining an interior. One or more pairs of screws project forward from the box from positions generally adjacent diagonally opposite corners of the front opening, with each screw having a screw head and a threaded shank. The boxes may be of any reasonable depths or side wall square dimensions and remain compatible with the mounting device within the scope of the present invention.

Figure 1B:
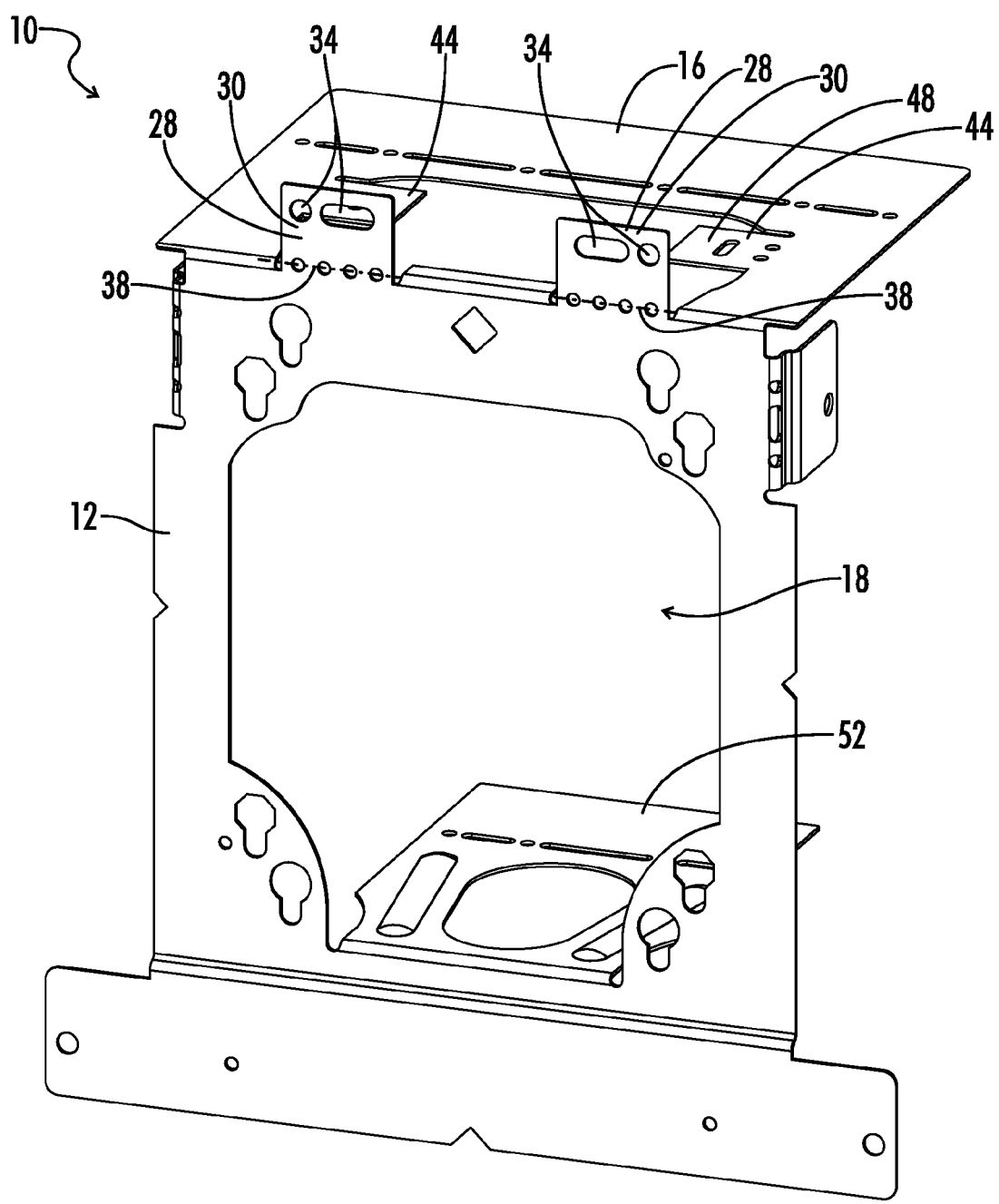
FIG. 1b is an isometric view of the mounting device of FIG. 1a, with several tabs flexed into different positions.
Figure 1C:
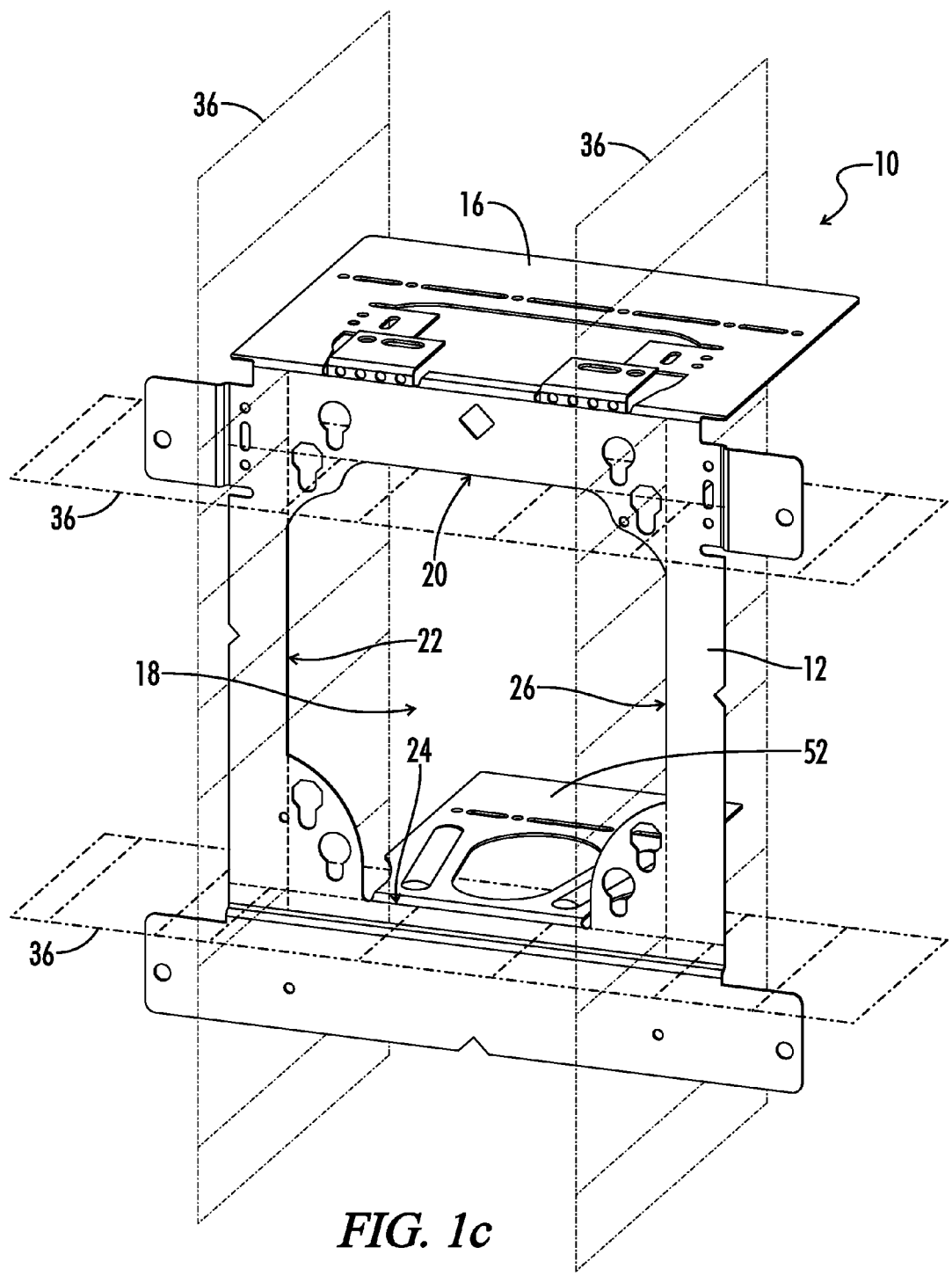
FIG. 1c is an isometric view of the mounting device of FIG. 1a, with mounting planes shown with respect to four aperture sides.

Referring more specifically to FIGS. 1a-1c, an embodiment of a mounting device 10 or bracket 10 of the present invention is shown. The bracket 10 has a first generally rectangular plate portion 12 or first plate 12 having a front face 14. An aperture 18 is defined within the first plate 12. The aperture 18 has four sides 20, 22, 24, 26, with a first pair of sides 20, 24 being substantially parallel and a second pair of sides 22, 26 being substantially parallel and further substantially perpendicular to the first pair 20, 24. The aperture 18 is generally shaped to permit access to the interior of an electric box positioned with respect to the bracket 10, as is known in the art.

Each side 20, 22, 24, 26 of the aperture 18 further independently defines a mounting plane 36, each of the four mounting planes 36 substantially perpendicular to the first plate 12 and collinear with respect to the associated aperture side 20, 22, 24, 26. The mounting planes 36 associated with the first pair of aperture sides 20, 24 are substantially parallel and the mounting planes 36 associated with the second pair of aperture sides 22, 26 are further substantially parallel. The mounting planes 36 as defined are indicated in FIG. 1c.

A second plate portion 16 or second plate 16, the second plate 16 is attached to the first plate 12 proximate the first side 20 of the aperture 18 and extends rearward and substantially perpendicular to the first plate 12.

In an embodiment as shown in FIGS. 1a-1c, a plurality of mounting portions 28 or fastening portions 28 are provided with respect to the first plate 12. Certain of the mounting portions 28 are mounting tabs 30 that are attached to and extend from the first plate 12. The mounting tabs 30 may be flexible about an axis 38 defined by the area of attachment 38 to the first plate 12. Alternatively, the tabs 30 may be flexible about any other defined axis along their length between a position parallel with the first plate 12 and various desired alternative positions relative to the first plate 12. The tabs 30 may be flexible due to a weakened or perforated area along their length, or the tabs 30 may by design be inherently flexible along their entire length. In FIG. 1a, two tabs 30 are shown flexed to a position parallel with the first plate 12 for mounting to structural members adjacent a left or right edge of the bracket 10. Two other tabs 30 are shown flexed to a position perpendicular with the first plate 12. Alternatively, as shown in FIG. 1b, the tabs 30 may be inversely flexed from the positions shown in FIG. 1a so as to permit mounting for example to a structural member adjacent a top edge of the bracket 10.

The mounting portions 28 may further include one or more mounting tabs 32 that are not flexible with respect to the first plate 12, and may in various embodiments be merely an integral portion of the first plate 12. The non-flexible tab 32 as shown in FIG. 1a may fully extend along one edge of the first plate 12 and beyond the adjoining edges.

In alternative embodiments the bracket 10 may include only non-flexible tabs 32, flexible tabs 30, or even one continuous mounting portion 28 located around the entire first plate 12 and extending from each edge of the first plate 12.

Referring again to FIGS. 1a-1c, a plurality of mounting holes 34 are disposed among the mounting portions 28. The mounting holes 34 are disposed such that one or more of the mounting holes 34 are located opposite the aperture 18 with respect to mounting planes 36 defined by each of the aperture sides 20, 22, 24, 26. For example, with respect to the orientation shown one or more mounting holes 34 are located above a mounting plane 36 defined by a first aperture side 20, one or more mounting holes 34 are located to the left of a mounting plane 36 defined by a second aperture side 22, one or more mounting holes are located below a mounting plane 36 defined by a third aperture side 24, and one or more mounting holes are located to the right of a mounting plane 36 defined by a fourth aperture side 26. In alternative orientations, the directional terminology may of course change without affecting the scope of the invention as described.

Figure 3:
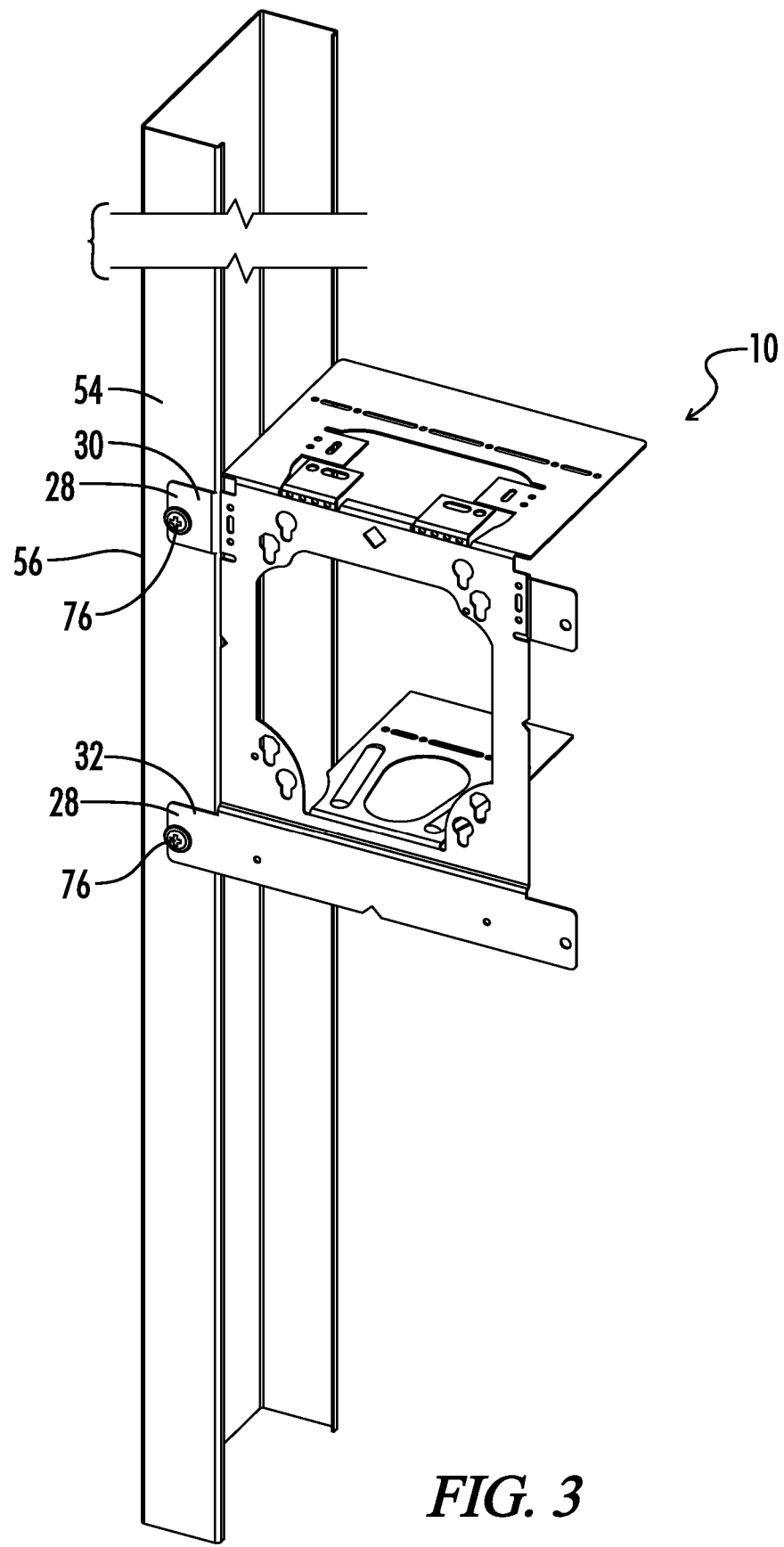
FIG. 3 is an isometric view of the mounting device of FIG. 1, mounted to a vertical structural member.
Figure 4:
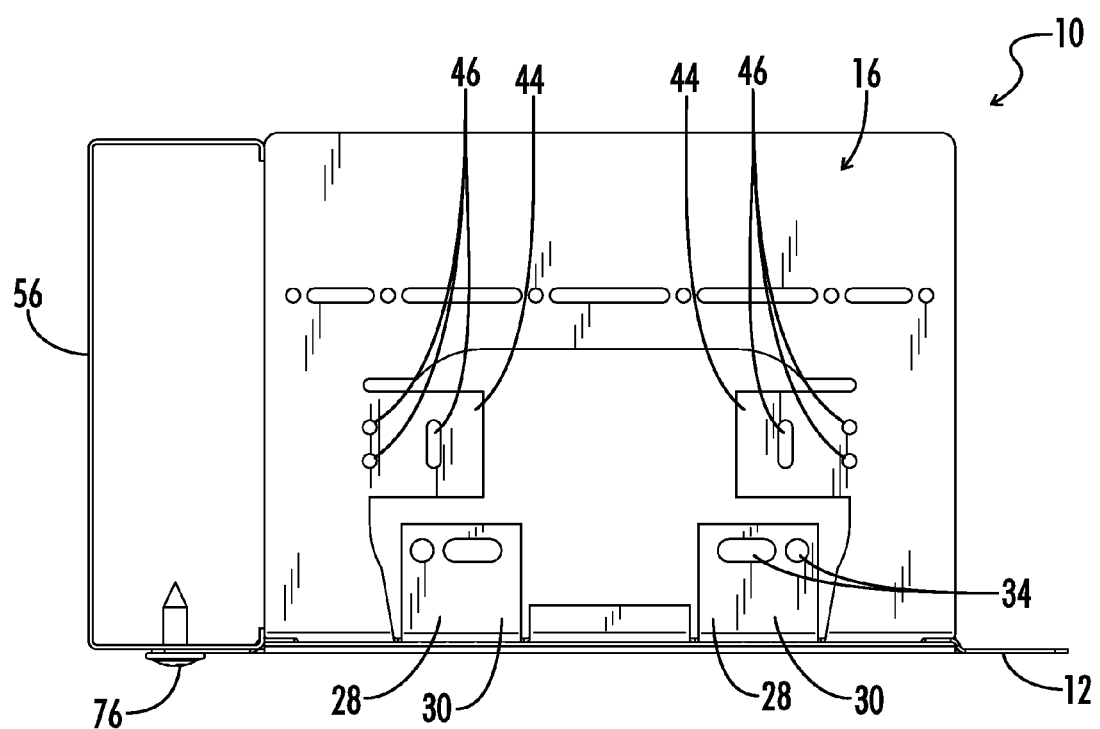
FIG. 4 is a top view of the mounting device of FIG. 1, mounted to a vertical structural member.
Figure 5:
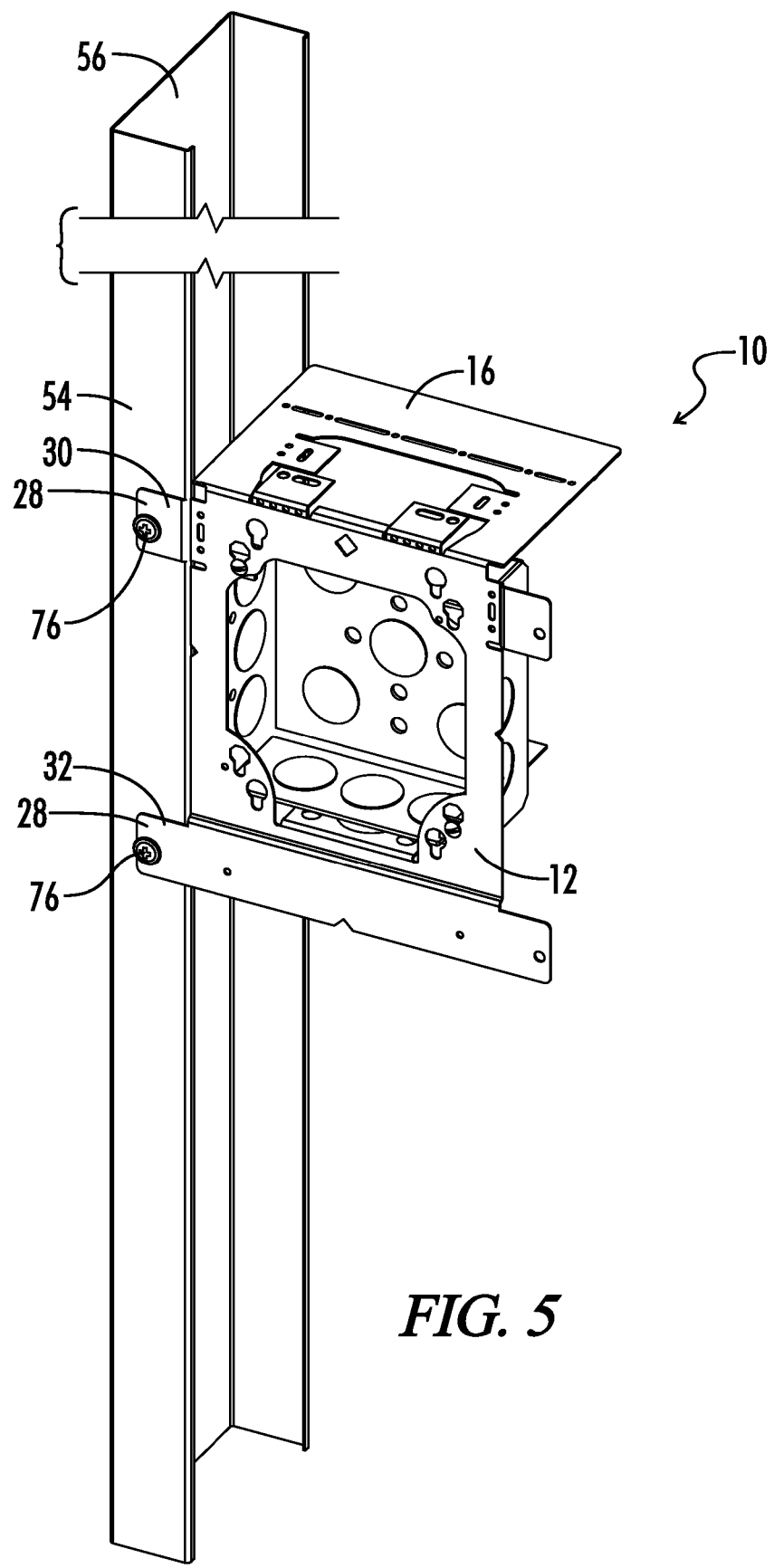
FIG. 5 is an isometric view of the mounting device of FIG. 1, mounted to a vertical structural member and including an electric box fastened to the device.
Figure 6:
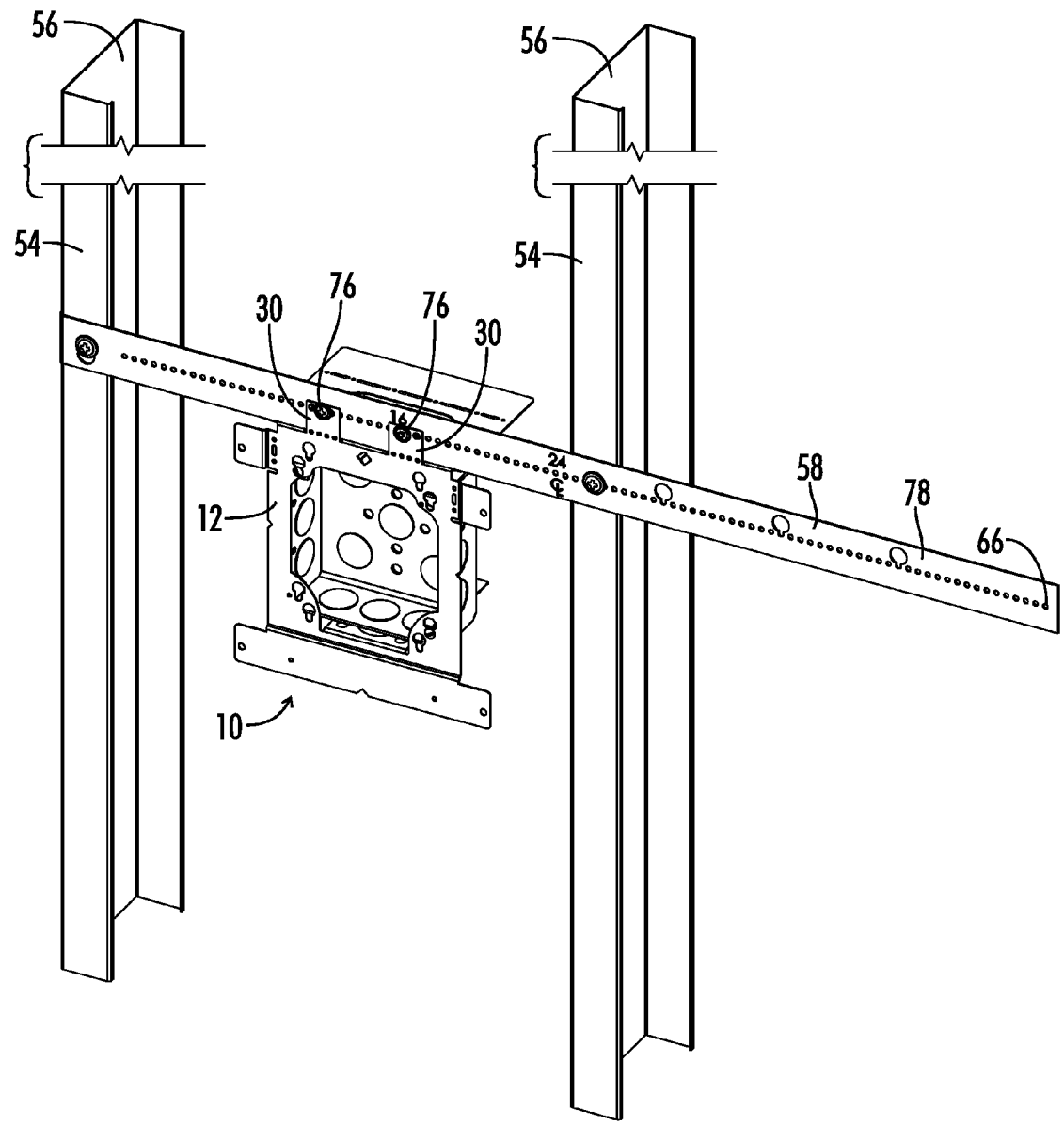
FIG. 6 is an isometric view of the mounting device of FIG. 1, mounted to and suspended from a horizontal element further mounted between two vertical structural members.

The mounting holes 34 in embodiments as previously described are positioned such that in one particular orientation of the bracket 10, one or more mounting holes 34 are available to mount the bracket 10 to a vertical structural member adjacent either of the left or right sides of the bracket 10 or to a horizontal element mounted to at least one vertical structural member and adjacent either of the top or bottom sides of the bracket. Referring to FIGS. 3-5, a bracket 10 is shown mounted to a front face 54 of a vertical structural member 56, in this case a wall stud 56 located adjacent the left side of the bracket 10 in a particular preferred orientation. Referring to FIG. 6, a bracket 10 is shown mounted to a horizontal element 58 that is further mounted between two vertical wall studs 56. The horizontal element 58 is further in this example a horizontally positioned spanner bar 58 as further described below.

Figure 2:
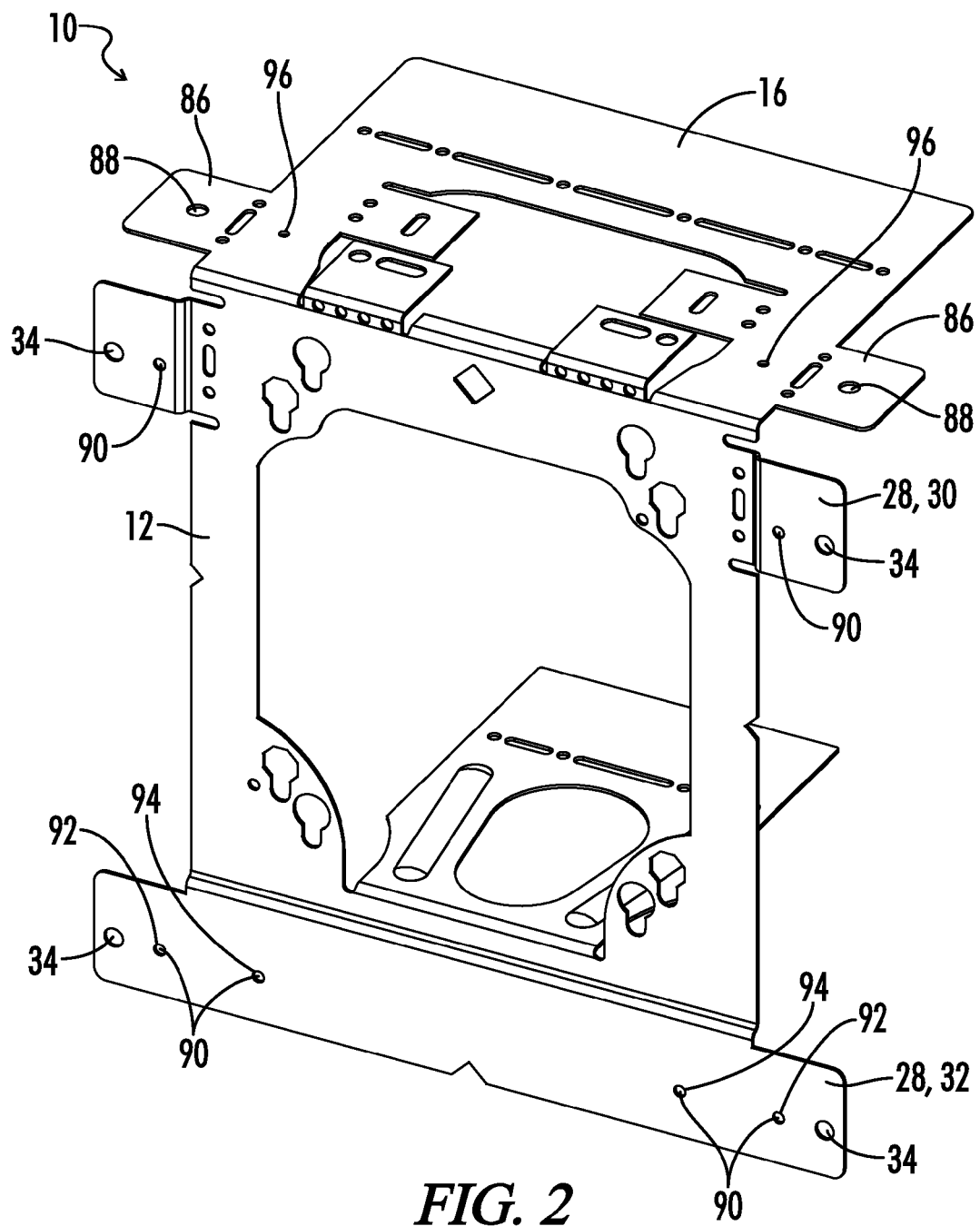
FIG. 2 is an isometric view of a mounting device of another embodiment of the present invention.

In an embodiment as shown in FIG. 2, the second plate 16 may further include at least one overlap tab 86 attached to an edge of the second plate adjacent to the edge attached to the first plate 12. The at least one overlap tab 86 may be flexible about the area of attachment to the second plate 16, in similar fashion to the mounting tabs 30 attached to the first plate 12. The overlap tab 86 may further include at least one second plate mounting hole 88 defined within the overlap tab 86, and the second plate 16 may further have an overlap tab fastening hole 96 defined within the second plate 16 adjacent each of the at least one overlap tabs 86.

As described herein, "mounting holes" 34, 88 are typically of a first size whether located on mounting tabs extending from the first plate 12 or from the second plate 16. "Fastening holes" 90, 92, 94, 96 may be distinguished with regards to their location on the bracket 10 itself, but are typically of a uniform second size smaller than the first size associated with the mounting holes 34. The large and small sizes are not necessarily uniform throughout the bracket, but this may preferably be the case for simplicity. In this manner mounting holes 34 and corresponding fastening holes 90, 92, 94, 96 may in conjunction permit adequate fastening of adjacent brackets in certain circumstances as further described herein.

Figure 17:
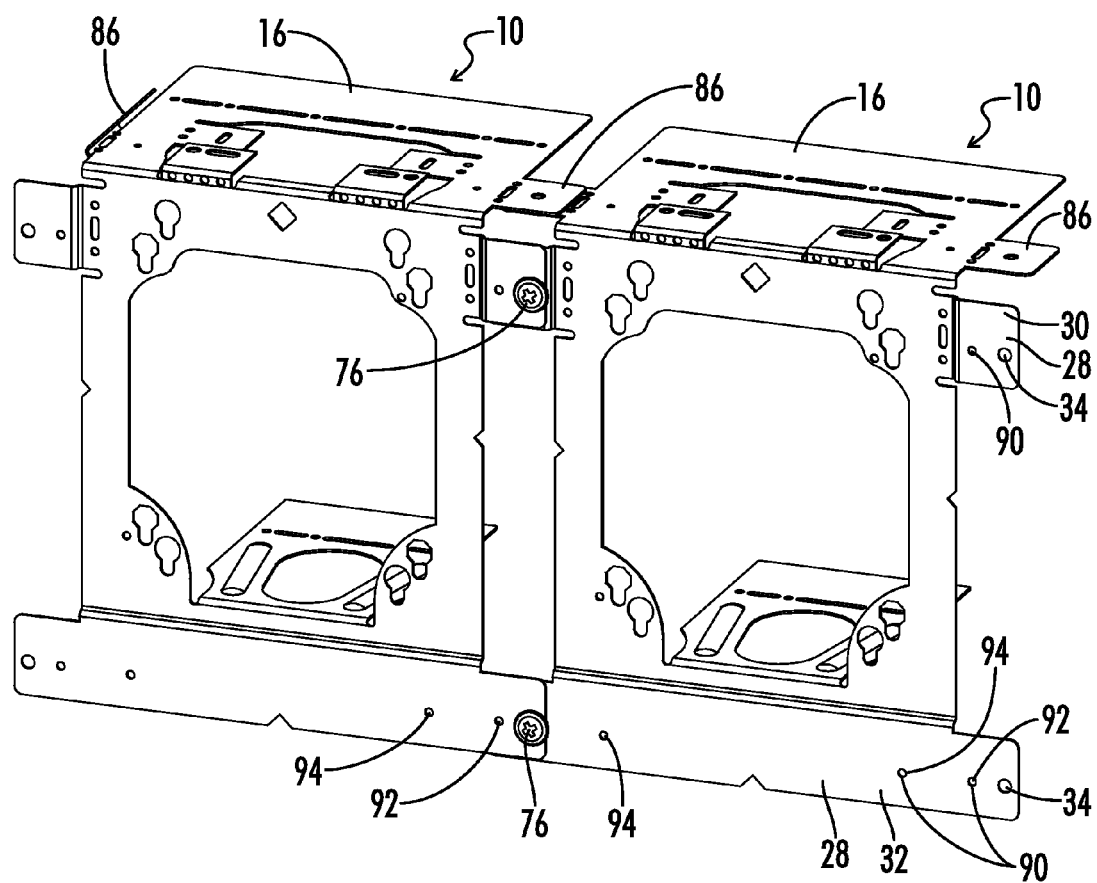
FIG. 17 is an isometric view of two mounting devices of the embodiment of FIG. 2, connected and mountable to a single vertical structural member.

The second plate mounting hole 88 is preferably located such that when the bracket 10 is positioned adjacent another like bracket 10, the mounting hole 88 of the first bracket 10 will correspond with a fastening hole 96 of the like bracket 10. When the mounting hole 88 on a first bracket and fastening hole 96 on a second bracket are positioned as described, the brackets 10 may be connected using a fastening structure 76 such as a screw 76 shaped to fit the holes 88, 96. In this fashion a pair of brackets may be mounted to each other as shown in FIG. 17. Where overlap tabs 86 as so described are located on both opposite edges of the second plate 16, three or more brackets 10 may be supportably connected in series to form a substantially stable rack of brackets 10 as further shown in FIG. 18.

In embodiments such as those shown for example in FIGS. 2, 17, the bracket 10 may be further supportably connected to adjacent brackets 10 using at least one mounting tab fastening hole 90 defined within at least one mounting portion 28 located on the first plate 12. In the example as shown, fastening holes 90 are located on both of flexible tabs 30 and non-flexible tabs 32, but this is merely illustrative and not intended as being limiting. Fastening holes 90 are shown along the non-flexible tab 32 of the first plate 12 such that the bracket 10 may be supportably connected to an adjacent bracket 10 using an outside set of fastening holes 90, 92 with the overlap tabs 86 extended parallel with the second plate 16. Fastening holes 90 are further shown along the non-flexible tab 32 of the first plate 12 such that the bracket 10 may be supportably connected to an adjacent bracket 10 using an inside set of fastening holes 90, 94 with the overlap tabs 86 flexed to a position perpendicular with the second plate 16.

For clarity, various methods of connecting and mounting various embodiments of the bracket 10 are further described below in this section.

The first plate 12, being generally rectangular in shape as previously described, inherently has first and second pairs of opposite corners. The first plate 12 further includes at least one pair of screw receiving formations 40 generally adjacent at least one of the pairs of opposite corners of the first plate 12. In the embodiment shown in FIGS. 1-2, two pairs of screw receiving formations 40 are positioned adjacent each opposing corner of the first plate 12, for accommodating screw arrangements on electric boxes of both large and small sizes. In alternative embodiments, each screw formation 40 may be shaped to accommodate all screw arrangements without requiring more than one screw formation at each corner, as is known in the art.

Each screw receiving formation 40 has an end 42 shaped to prevent passage of a screw head through the screw receiving formation 40 in either direction along an orientation transverse to the first plate 12. Each screw receiving formation 40 is further configured to permit the threaded screw shanks to slide laterally, from a first shank position where transverse passage of the screw heads is permitted, to a second shank position in association with the screw receiving formation end 42. In various embodiments as shown in FIGS. 1-2, the formations 40 are keyholes having a large portion to permit passage of the screw heads in a transverse orientation to the first plate 12, and shaped to permit the shanks to slide from the large portion to the end 42 wherein the screw heads may not be pulled out in a transverse orientation to the first plate 12. In alternative embodiments, the formations 40 may have an open end contiguous with the defined first plate aperture 18, rather than be independently defined. In such embodiments, the screw heads pass through the aperture 18 itself, and the formations 40 are shaped to permit lateral passage of the screw shanks from a position defined substantially within the aperture 18 to a second shank position associated with the end 42 of the formation 40. The first and second positions for the screw shanks as described further define first and second positions, respectively, for an electrical box having its screws received within the screw receiving formations 40 as described.

In preferred embodiments of the present invention, the screw receiving formations 40 are shaped such that in a preferred orientation of the bracket 10 with respect to a vertical structural member, the formation ends 42 are vertically positioned at a lowest point of the screw receiving formation 40. An electrical box that has been positioned in the second electric box position as previously described will therefore be at least partially prevented from falling loose or otherwise dislodging from the bracket 10 prior to being more permanently screwed in place.

In an embodiment of the invention as shown in FIGS. 1*a*-1*c* and FIG. 4, the bracket 10 may further include at least one locking tab 44 attached to the second plate 16. The second plate 16 may include an opening 50 defined within the second plate 16, with each locking tab 44 attached to an edge of the opening 50. The locking tab 44 may be flexible about one or more axes 46 along its length about which a distal portion 48 of the locking tab 44 may flex. The axes 46 may include a weakened or perforated area of attachment to the second plate 16, for example, or similarly weakened areas along its length, or the entire locking tab 44 may be sufficiently flexible to permit flexing at any desired axes along its length.

In this manner the locking tab 44 may flex from an unlocked position to a locked position engaging an electrical box positioned against the bracket 10. The unlocked position is associated with a substantially parallel configuration with respect to the second plate 16 and wherein an electrical box is permitted to laterally slide between the first and second electrical box positions as previously described. This position is also shown in FIG. 5. The locked position is associated with a non-parallel configuration with respect to the second plate 16 wherein the electrical box is engaged by the distal portion 48 of the locking tab 44 and substantially prevented from laterally sliding between the first and second electrical box positions.

Figure 8:
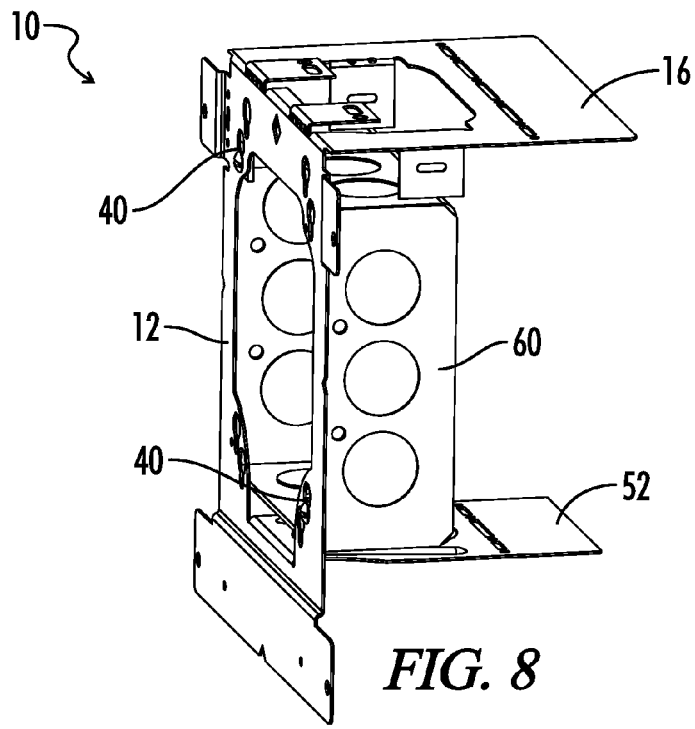
FIG. 8 is an isometric view of the mounting device of FIG. 1, including a small electric box fastened to the device and held in place with locking tabs.
Figure 9:
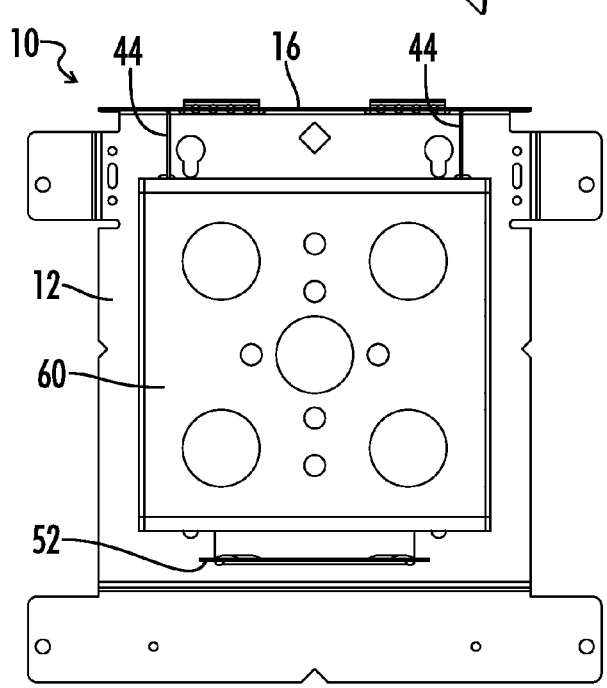
FIG. 9 is a rear view of the mounting device and electric box as shown in FIG. 8.
Figure 10:
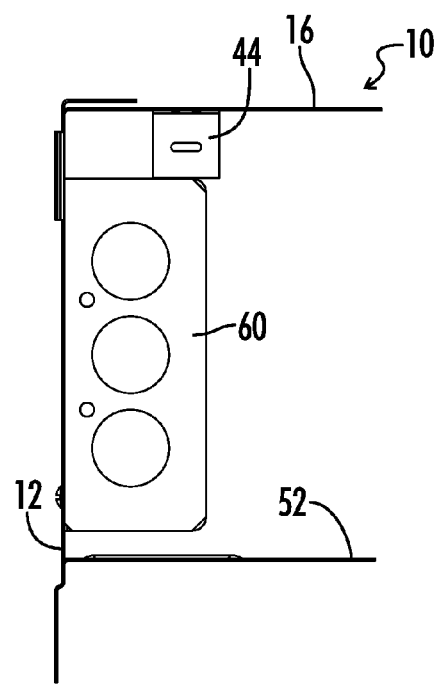
FIG. 10 is a side view of the mounting device and electric box as shown in FIG. 8.

Referring now to FIGS. 8-10, an electrical box of a first size 60 is mounted in a desired position with respect to the bracket 10 using a first pair of screw receiving formations 40. The locking tabs 44 are shown flexed to a position fully perpendicular to the second plate 16 and engaging the electrical box 60 to secure it in position and prevent lateral movement with respect to the first plate 12.

Figure 11:
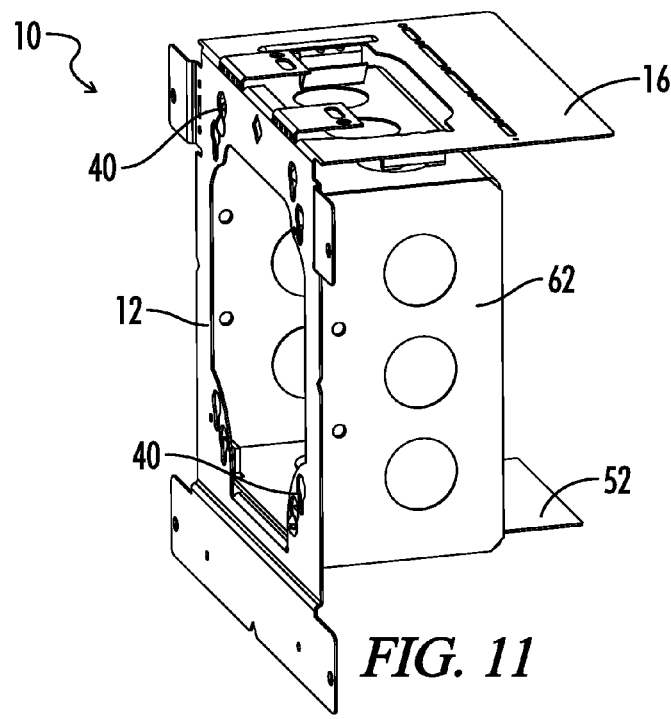
FIG. 11 is an isometric view of the mounting device of FIG. 1, including a large electric box fastened to the device and held in place with locking tabs.
Figure 12:
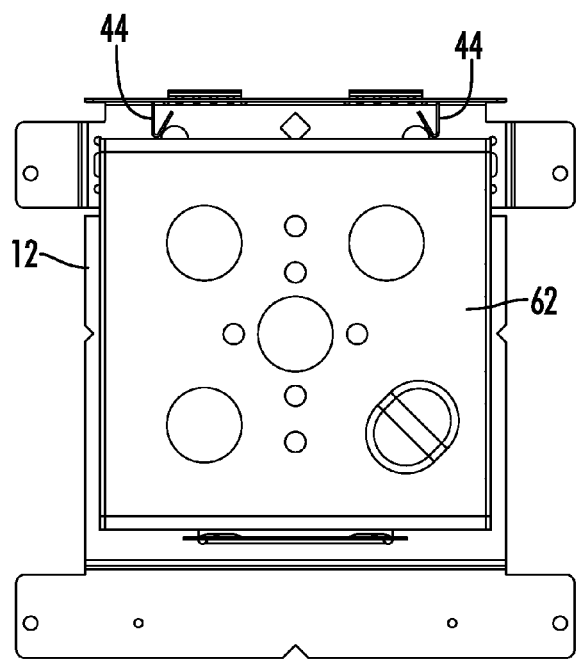
FIG. 12 is a rear view of the mounting device and electric box as shown in FIG. 11.
Figure 13:
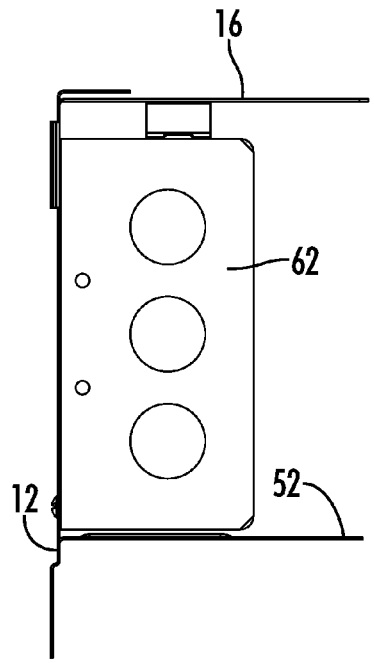
FIG. 13 is a side view of the mounting device and electric box as shown in FIG. 11.

Referring now to FIGS. 11-13, an electrical box of a second size 62 is mounted in a desired position with respect to the bracket 10 using a second pair of screw receiving formations 40. The locking tabs 44 are shown flexed about a second axis along their lengths and engaging the electrical box 62 to secure it in position and prevent lateral movement with respect to the first plate 12.

Referring generally to FIGS. 1-18, in various embodiments of the present invention the bracket 10 may further include a third plate 52 attached to the first plate 12, and extending rearward from and substantially perpendicular to the first plate 12. The third plate 52 may generally be located on an opposing side of the aperture 18 of the first plate 12 with respect to the second plate 16. The second and third plates 16, 52 may generally be substantially parallel with each other, and in various embodiments may be of substantially the same length with respect to the first plate 12. In this manner the second and third plates 16, 52 may provide additional support for the bracket 10 within the wall cavity as is known in the art. The third plate 52 may also include one or more locking tabs 44. These locking tabs 44 may be supplemental to or in place of locking tabs 44 on the second plate 16, depending on the configuration of the screw receiving formations 40 and/or design preferences.

In certain embodiments one or more mounting brackets 10 of the present invention may be used in combination with a spanner bar 58 to make up a universal mounting system. The spanner bar 58 in embodiments as shown in FIGS. 6, 7, 14, and 15 is a substantially planar member of a length sufficient to mount between two adjacent vertical wall studs 56. A plurality of spanner bar fastening holes 66 are positioned in a row extending substantially the length of the spanner bar 58. The spanner bar 58 may have a distal portion 64 that is bent at a right angle to the remainder of the spanner bar 58. Alternatively, the distal portion 64 may be merely flexible about an area of attachment 70 to the remainder of the spanner bar 58 between a right angle and a parallel configuration. In either event, the area of attachment for the distal portion 64 to the remainder of the spanner bar 58 defines a reference axis 70.

Figure 14:
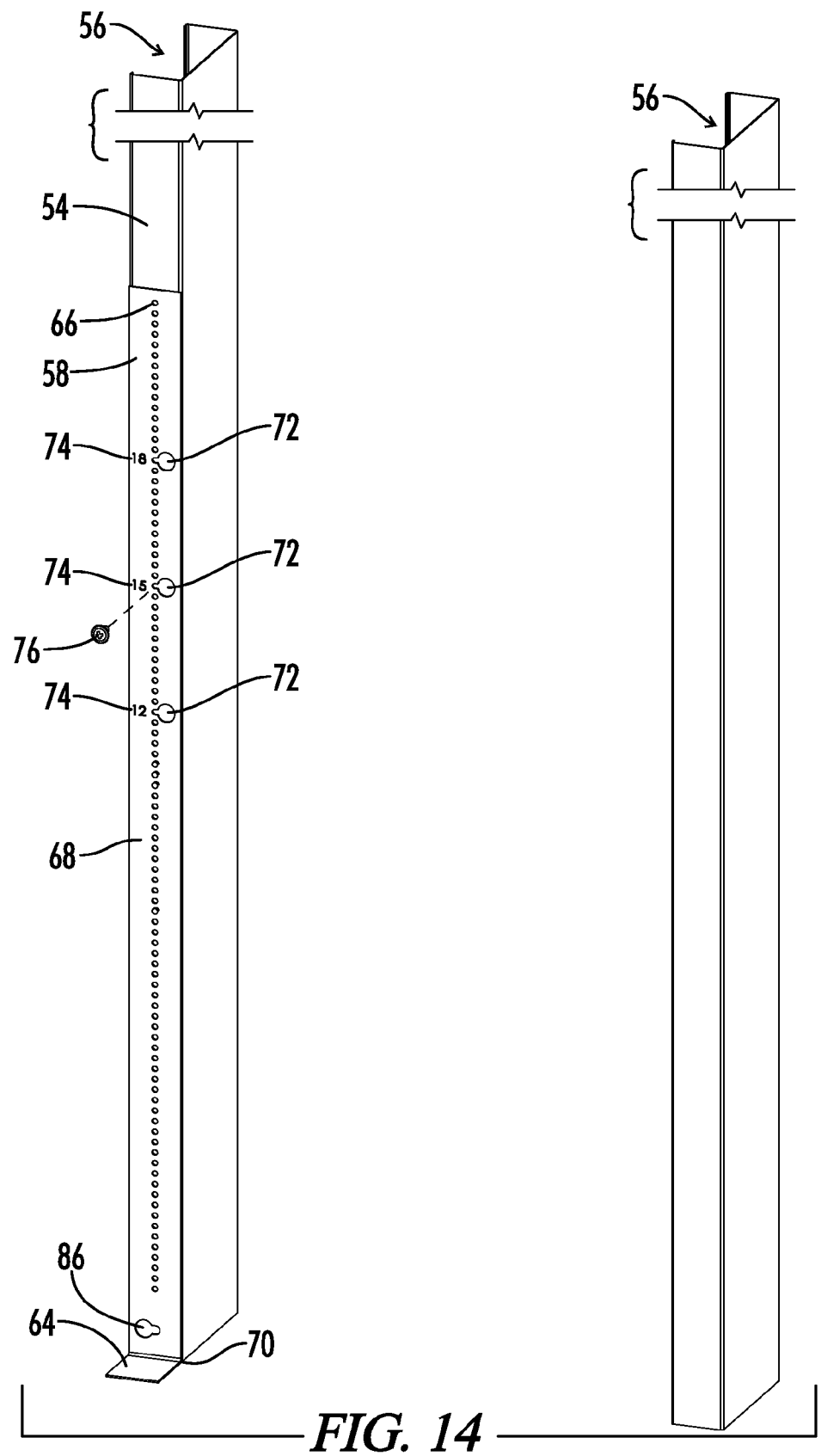
FIG. 14 is an isometric view of a spanner bar of an embodiment of the present invention vertically positioned against a first vertical structural member and with respect to a second vertical structural member.

On a first face 68 of the spanner bar 58 as shown in FIG. 14, the spanner bar 58 includes a plurality of height indicators 74 located along the length of the spanner bar and measured with respect to the reference axis 70. The height indicators 74 are marked accordingly so as to represent a desired distance from the reference axis 70. Rather than indicating a true distance, the height indicators 74 in the embodiment shown are associated with a central point of an electric box once it is mounted within a wall cavity as described below. The particular distances indicated by the height indicators 74 generally relate to acceptable distances for the central point of an electric box to be located from the floor, as defined by relevant building codes. Each indicator 74 includes a keyhole 72 which may on one end for example incorporate one of the spanner bar fastening holes 66.

In accordance with a spanner bar 58 having the structure shown in FIG. 14, the distal portion 64 may be placed on the floor adjacent a vertical wall stud 56, such that the remainder of the spanner bar 58 is placed against the front face 54 of the wall stud 56. A user may then apply a fastening device 76 such as a screw through a keyhole 72 at a desired height associated with one of the height indicators 74, without requiring any measurements. The user may choose to only apply the fastening device 76 partially, wherein the spanner bar 58 may be removed from the position against the wall stud 56 with the fastening device 76 remaining in place at the desired height on the wall stud 56 with respect to the floor.

Figure 7:
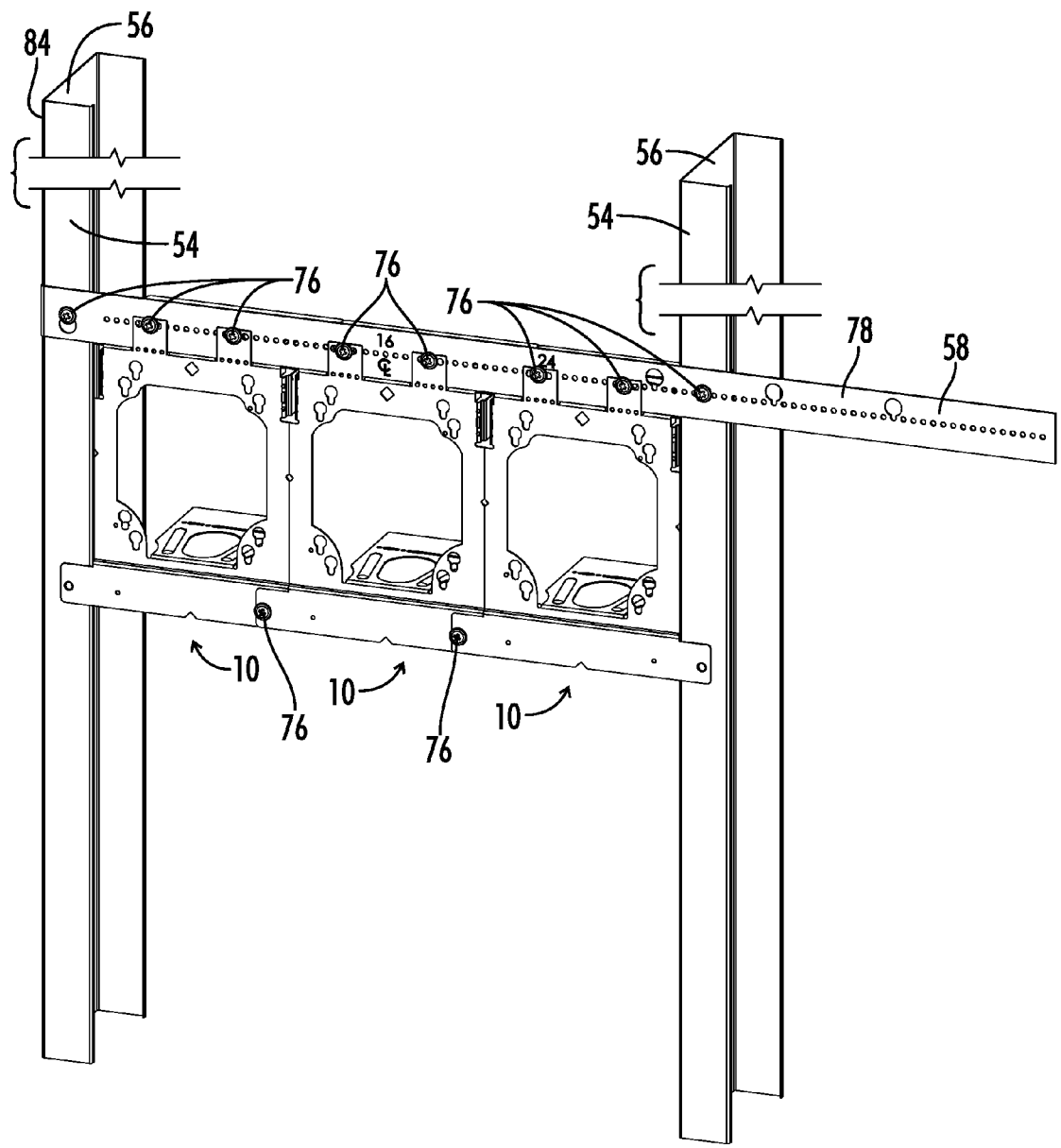
FIG. 7 is an isometric view of a plurality of the mounting devices of FIG. 1, mounted to and suspended from a common horizontal structural member further mounted between two vertical structural members.
Figure 15:
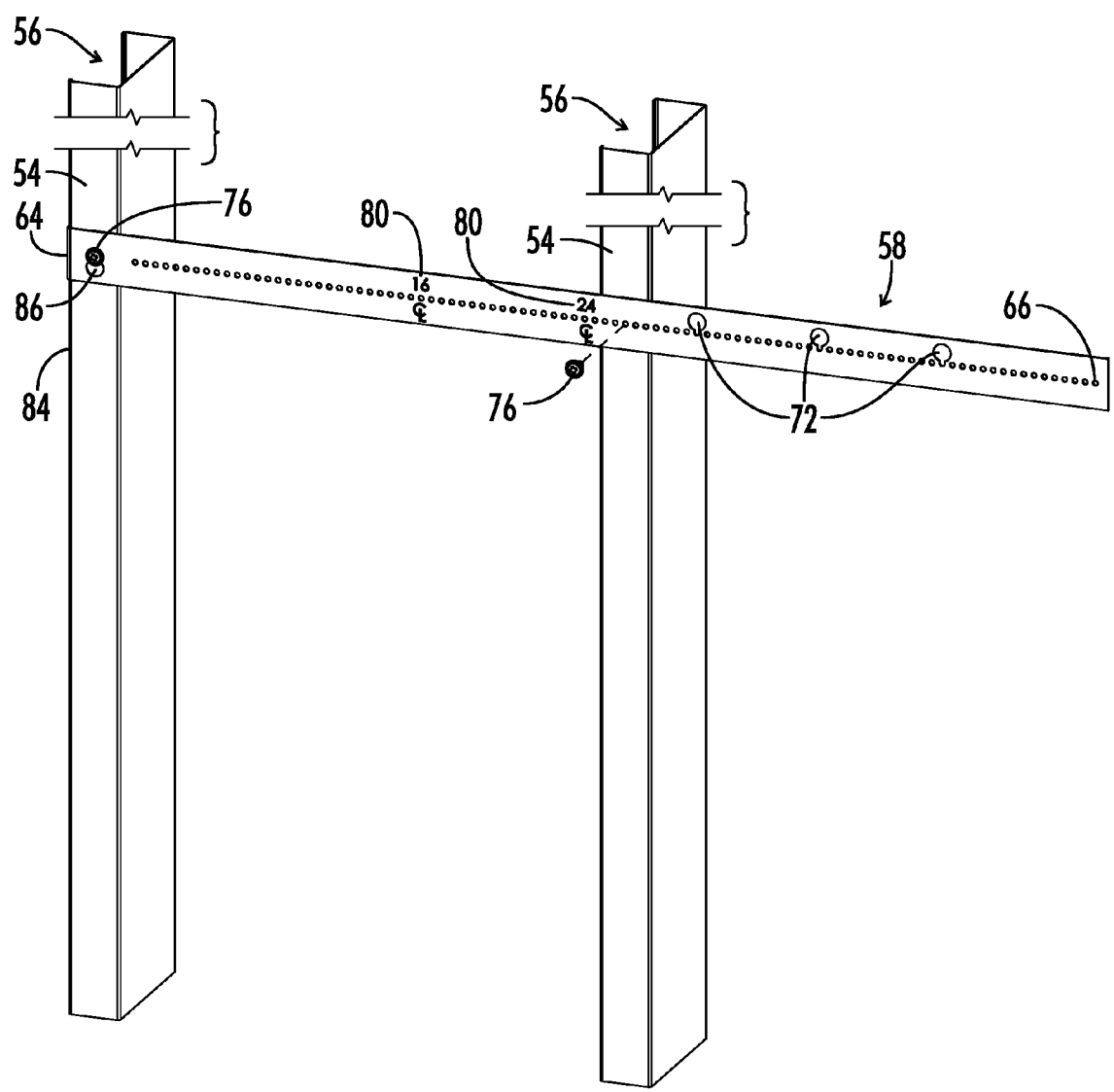
FIG. 15 is an isometric view of the spanner bar of FIG. 14, horizontally positioned with respect to the vertical structural members.

On a second face 78 of the spanner bar 58 as shown in FIGS. 6, 7, 15, a plurality of symbols 80 may further be applied to indicate distances along the spanner bar 58 with respect to adjacent vertical wall studs 56. In the embodiment shown, the symbols 80 are numbers indicating central points between wall studs of typical spacing. Referring to FIG. 7, the bracket 10 may in certain embodiments further have a reference point 82 defined on or within the first plate 12 to indicate the central point of the bracket 10, wherein the bracket 10 may be easily fastened to the spanner bar 58 at a precise central location with respect to two adjacent wall studs 56 of a known spacing.

In accordance with a spanner bar 58 having the structure shown in FIGS. 6, 7, 15, the distal portion 64 may therefore be placed against an opposite edge 84 of a vertical wall stud 56 with respect to the remainder of the spanner bar 58, such that the remainder of the spanner bar 58 extends horizontally along the front face 54 of the wall stud 56 and to the front face 54 of an adjacent wall stud 56. A user may then apply a fastening device 76 such as a screw through a keyhole 86 inverted with respect to the previously mentioned keyholes 72 but otherwise similar in shape. The inverted keyhole may generally be located proximate the reference axis 70. The narrow end of the inverted keyhole 86 may further be located on the top end of the keyhole 86 when the second side 78 of the spanner bar 58 is facing away from the wall stud 56, whereas the narrow end of the first keyholes 74 are located on the top end of the keyholes 74 when the first side 68 is facing away from the wall stud 56.

Referring to FIG. 7 in particular, the mounting system as shown and previously described and including one or more mounting brackets 10 and spanner bar 58, may be used to mount a plurality of electrical boxes between two adjacent wall studs 56 without requiring additional brackets beyond those required for an individual electrical box. The first plate 12 of the brackets 10 of the present invention may further include mounting holes positioned to align with mounting holes of another like bracket 10 such that the brackets 10 may be fastened together for added stability.

Figure 16:
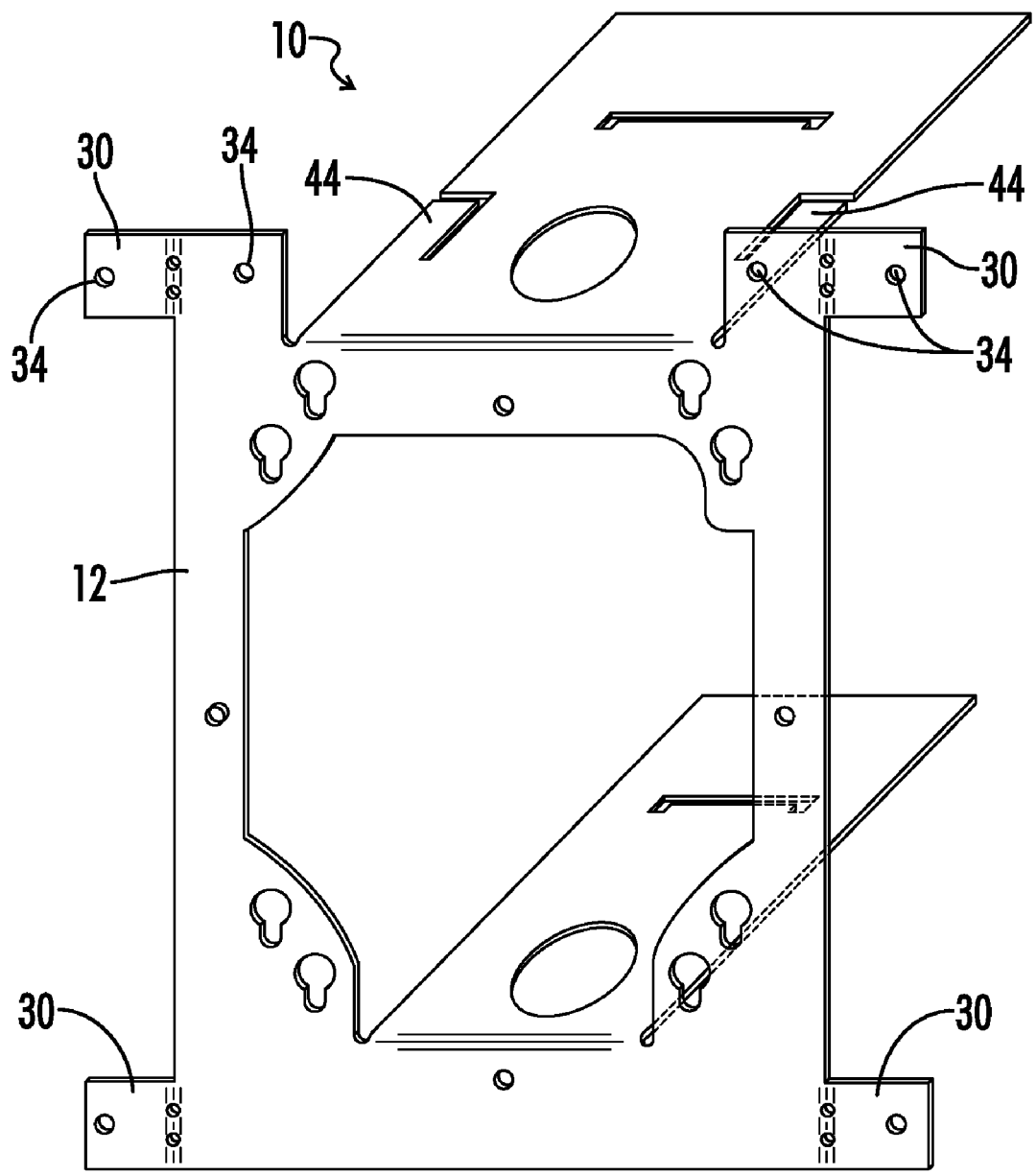
FIG. 16 is an isometric view of a mounting device of another embodiment of the present invention.

Referring now to FIG. 16, in an embodiment the bracket 10 may have mounting tabs 30 that extend upward from a top edge of the first plate 12 and further extend to the sides in an L-shaped configuration. The same tab 30 in this manner may be used to fasten the bracket 10 to a structural member adjacent the top or side edge of the bracket 10. The tab 30 may be flexible about a first axis generally including the area of attachment to the first plate 12, and may further be flexible about a second axis generally collinear with the side edge of the first plate adjacent the tab 30. The portion of each tab 30 that extends upward and the portion of the same tab 30 that extends to the side may both have mounting holes 34 that line up with each other when the tab 30 is flexed along its central axis and back toward the center of the first plate 12. In the embodiment shown, additional tabs 30 extend from the bottom of each side edge of the first plate 12. However, the bottom tabs 30 could also be L-shaped tabs 30 extending to the side and simultaneously downwards, extending from the bottom edge of the first plate 12 and simultaneously to the side in a similar manner as above, or other configurations as reasonably anticipated within the scope of the present invention.

In embodiments of the bracket 10 as generally shown throughout FIGS. 1-18, a plurality of the brackets 10 further may be easily and effectively stacked atop each other. As the brackets 10 will ordinarily be distributed in bulk quantities, this feature represents a unique improvement over prior art brackets used for pre-assembling electrical boxes.

The bracket 10 in various embodiments may generally be integrally formed from a single piece of material such as sheet metal. Particular embodiments may be integrally formed from a single sheet of steel. This composition may provide stability while yet remaining substantially lightweight. However, it may be anticipated that alternative embodiments may utilize separate components to form the bracket 10 of the present invention. In this way for example, components that are intended to be flexed or otherwise adjustable by the user may be constructed of more flexible material than other components so as to help maintain rigidity in the overall structure.

Referring generally to FIGS. 1-18, in various embodiments of the present invention the bracket 10 may be mounted to other like brackets 10, vertical structural members or horizontal elements using a plurality of methods as herein further described:

In a first method, an embodiment of the bracket 10 as shown in FIGS. 1a-1c and 5 may be mounted to a vertical structural member 56. The bracket 10 is desirably positioned with respect to the structural member 56. At least one mounting portion, in the embodiment shown two mounting tabs 30, 32, are positioned parallel with the front face 54 of the structural member 56. Fastening devices 76 such as screws 76 for example may be applied through mounting holes 34 to mount the bracket 10 on the structural member 56.

In an alternative embodiment of the bracket 10 such as shown in FIG. 2, the method remains the same with the additional step of flexing the second plate mounting tabs 86 out of any conflicting path with an adjacent bracket 10 or structural member 56.

With respect to either embodiment as described, a second bracket 10 may be mounted to an opposite side of the structural member 56 using the same fastening device 76. The mounting holes 34 of each bracket may be positioned to overlap when the brackets are mounted at the same height along the structural member 56, and therefore a single fastening device 76 may be used for each overlapping set of mounting holes 34.

In a second method, a first bracket 10 is selected for mounting to a vertical structural member 56 as described in the first method. The first bracket 10 may be mounted to the structural member 56 as a first step of the method, or as the last step of the method. A second bracket 10 is positioned adjacent the opposite side of the first bracket 10 with respect to side to be mounted to the structural member 56. The mounting holes 34 within both mounting tabs 30, 32 on either the first or second bracket 10 are positioned to correspond with the fastening holes 90, 92 within the mounting tabs 30, 32 on the other of the first or second bracket. The mounting holes 34 are positioned on the outside of the fastening holes 90, 92, such that a fastening device 76 passes through the mounting holes 34 before the fastening holes 90, 92. The fastening device 76 may then be applied to connect the brackets 10, and the first bracket 10 may be mounted to the structural member 56 to produce a securely cantilevered bracket system as shown in FIG. 17 for mounting two electrical boxes to one side of a structural member 56.

Figure 18:
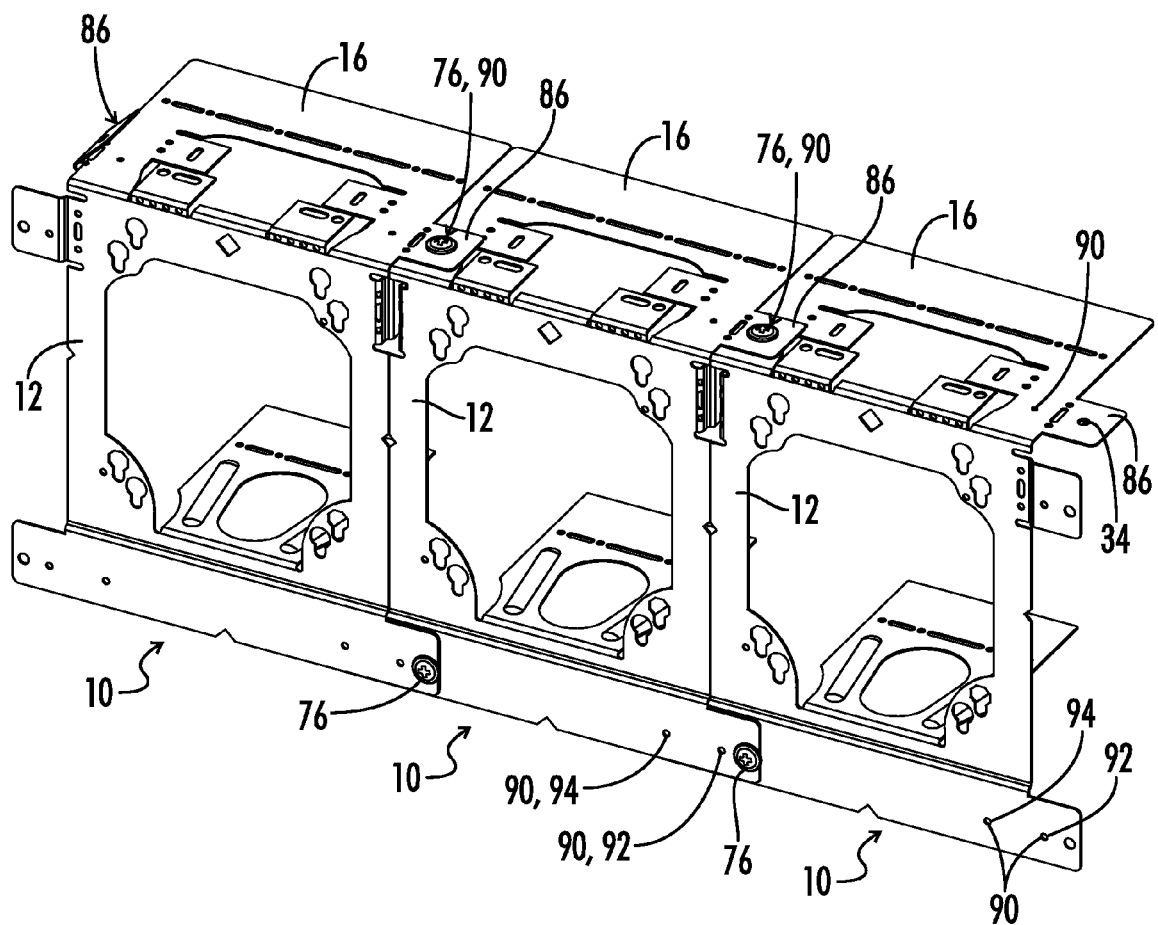
FIG. 18 is an isometric view of three mounting devices of the embodiment of FIG. 2, connected and mountable as a combination to two vertical structural members.

In a third method, three brackets 10 of an embodiment as shown in FIG. 2 may be connected as further shown in FIG. 18 and mounted in series between two vertical structural members 56. First and second brackets 10 are positioned adjacent each other, with flexible mounting tabs 30 bent to a rearward position perpendicular to the first plate 12. Mounting tabs 32 for both brackets 10 are positioned to overlap, with the mounting hole 34 for either the first or second bracket 10 positioned to correspond with the inward fastening hole 94 of the other bracket 10. An overlap tab 86 for either of the first or second bracket 10 is further positioned to overlap the second plate 16 of the other bracket 10, with the overlap tab mounting hole 88 corresponding to the second plate fastening hole 96. Two fastening devices 76 may then be applied through the corresponding sets of holes 34, 94 and 88, 96 to fasten the brackets together. The third bracket 10 may then in like fashion be fastened to the opposite side of the second bracket 10 with respect to the first bracket 10. The three brackets in combination may now be mounted to the structural members 56, with the first bracket 10 mounting to a first structural member 56 as described above in the first method, and with the third bracket 10 mounting to a second structural member 56 as described above in the first method.

In a fourth method, a spanner bar 58 is mounted at a desired height between two vertical structural members 56 as described in detail above. An embodiment of the bracket 10 as shown in FIGS. 1b and 6 is positioned at a desired horizontal location along the length of the spanner bar 58, with the mounting tabs 30 along the top edge of the first plate 12 flexed to a position parallel with the first plate 12. The mounting holes 34 of the mounting tabs 30 are positioned to correspond with fastening holes 66 on the spanner bar 58. A fastening device 76 is then driven through the holes 34, 66 to securely mount the bracket 10 to the spanner bar 58.

In a fifth method, a spanner bar 58 is mounted at a desired height between two vertical structural members 56 as described in detail above. Three brackets 10 of an embodiment as shown in FIGS. 1b and 7 are positioned as desired along the length of the spanner bar 58. First and second brackets 10 may be mounted using the fourth method, with the mounting tabs 30 along the top edge of each first plate 12 flexed to a position parallel with the first plate 12, and with the mounting tabs 30 along the side edges of the first plate 12 flexed to a position perpendicular to the first plate 12. The mounting holes 34 of the mounting tabs 30 are positioned to correspond with fastening holes 66 on the spanner bar 58. Fastening devices 76 are then driven through the holes 34, 66 to securely mount the brackets 10 to the spanner bar 58. The first and second brackets 10 are further interconnected for additional stability, as mounting portions 28, 32 for both brackets 10 are positioned to overlap, with the mounting hole 34 for either the first or second bracket 10 positioned to correspond with the inward fastening hole 94 of the other bracket 10. A fastening device 76 may then be driven through the holes 34, 94. A third bracket 10 may then be mounted to both of the spanner bar 58 and the opposite side of the second bracket 10 with respect to the first bracket 10, using the same steps as above.

The five methods presented herein are not exclusive, but merely intended to illustrate some common and anticipated uses of the mounting device of the present invention.

The previous detailed description has been provided for the purposes of illustration and description. Thus, although there have been described particular embodiments of the present invention of a new and useful "Universal Electric Box Mounting Device," it is not intended that such references be construed as limitations upon the scope of this invention except as set forth in the following claims.

What is claimed is:

1. A bracket for mounting one or more electrical boxes within a wall cavity, each box having side walls, a rear wall and a front opening collectively defining an interior, said bracket effective to be mounted to a vertical or horizontal structural member in a single orientation on any one of at least three sides and comprising:
   a first generally rectangular plate portion defining at least one aperture therein, said at least one aperture having four sides comprising a first pair of substantially parallel sides and a second pair of substantially parallel sides, said at least one aperture further shaped to permit access to said electrical box interior, at least three sides of said at least one aperture further defining at least three mounting planes extending tangentially to said aperture sides and perpendicular to said first plate portion;
   a second plate portion extending rearward and substantially perpendicular from said first plate portion proximate one side of said aperture, said second plate portion further comprising an opening having at least one locking tab attached to an edge of said opening, said locking tab comprising an area of attachment defining an axis about which the tab is flexible between
      an unlocked position wherein said electrical box is permitted to slide to a desired mounting position relative said bracket, and
      a locked position engaging said electrical box wherein said electrical box is prevented from laterally sliding from said desired mounting position relative said bracket;
   one or more mounting tabs extending from each of at least three edges of said first plate portion, and substantially in parallel with said first plate portion; and
   a plurality of mounting holes disposed among said mounting tabs, one or more of said mounting holes further located opposite said at least one aperture with respect to each of said at least three mounting planes.

2. The bracket of claim 1, said second plate portion further comprising at least one overlap tab attached to an edge of said second plate portion adjacent to an area of attachment to said first plate portion,
   said overlap tab flexible between a first position parallel with said second plate portion and at least one alternate position relative to said second plate portion.

3. The bracket of claim 2, said overlap tab further comprising a mounting hole defined within said overlap tab, said mounting hole positioned to correspond with a fastening hole defined within a second plate portion of an adjacent second bracket.

4. The bracket of claim 1, wherein at least one mounting tab extends from an edge of said first plate portion adjacent an area of attachment to said second plate portion,
   said mounting tab further comprising a fastening hole defined within said mounting tab, said fastening hole positioned to correspond with a mounting hole defined within a mounting tab on an adjacent second bracket.

5. The bracket of claim 4, wherein said mounting tab further comprises a mounting hole defined within said mounting tab, said mounting hole positioned to correspond with a fastening hole defined within a mounting tab on said adjacent second bracket.

6. The bracket of claim 1, said mounting holes further located opposite said at least one aperture with respect to each of four mounting planes perpendicular to said first plate portion and generally defined by all four sides of said aperture.

7. The bracket of claim 1, further comprising a third plate portion extending rearward and substantially perpendicular from said first plate portion.

8. The bracket of claim 7, said second plate portion having a length, said third plate portion having a length substantially equivalent to said second plate portion length.

9. The bracket of claim 7, at least one of said second and third plate portions further comprising an opening having at least one mounting tab attached proximate an edge of said opening nearest said first plate portion.

10. A bracket for mounting one or more electrical boxes within a wall cavity, each electrical box having side walls, a rear wall, and a front opening collectively defining an interior, said box further having one or more pairs of screws projecting forward from said box generally adjacent diagonally opposite corners of said front opening, each screw having a screw head and a threaded shank, said bracket comprising:
- a first plate having at least one aperture shaped to permit access to said electrical box interior, said aperture further comprising first and second pairs of diagonally opposite corners, said first plate further comprising one or more fastening portions configured to engage an exterior face of a structural member;
- a second plate extending rearward and substantially perpendicular to said first plate proximate one side of said aperture;
- at least one pair of screw receiving formations in said first plate generally adjacent at least one of said pairs of diagonally opposite corners of said aperture, said screw receiving formations having an end shaped to prevent passage of said screw heads through said formations along an orientation transverse to said first plate, said screw receiving formations further configured to permit lateral passage of said threaded shanks from a first shank position wherein transverse passage of the screw heads is permitted to a second shank position associated with said formation end, said first and second positions for said shanks further defining a first and second position of said electrical box with said screw heads so received by said formations; and
- at least one locking tab attached to an edge of an opening in said second plate, said attachment defining an axis about which the tab is flexible between an unlocked position wherein said electrical box is permitted to laterally slide from said first position to said second position, and a locked position engaging said electrical box wherein said electrical box is prevented from laterally sliding from said second position to said first position.

11. The bracket of claim 10, said bracket further comprising first and second pairs of screw receiving formations configured to receive an electrical box of a first size, and further comprising first and second pairs of screw receiving formations configured to receive an electrical box of a second size.

12. The bracket of claim 11, said at least one locking tab further comprising an area along its length that defines a second axis,
- said locking tab flexible about either of said first axis, said second axis, or both of said first and second axes between said unlocked position wherein an electrical box is permitted to laterally slide from said first position to said second position, and a locked position engaging said electrical box of either a large or a small size, and preventing lateral sliding from said second position to said first position.

13. The bracket of claim 10, said first plate further comprising one or more fastening portions and a plurality of mounting holes disposed about said one or more fastening portions,
- one or more of said mounting holes positioned for mounting the bracket to a vertical structural member adjacent either of two opposite sides of said bracket or to a horizontal element adjacent a third side of said bracket, while maintaining a particular bracket orientation.

14. A bracket for mounting electrical boxes, said bracket comprising:
- a generally rectangular first plate having at least one aperture defined within said first plate, said aperture further shaped to provide access to an electrical box mounted to said first plate, said aperture further comprising first and second pairs of diagonally opposite corners;
- a second plate extending rearward and substantially perpendicular to said first plate and located proximate a first side of said aperture, said second plate further comprising an opening;
- at least one box locking tab attached to an edge of the opening in said second plate, said box locking tab further comprising a flexible area of attachment to said second plate defining an axis about which the tab is flexible between an unlocked position wherein said electrical box is permitted to laterally slide from said first position to said second position, and a locked position engaging said electrical box wherein said electrical box is prevented from laterally sliding from said second position to said first position;
- said first plate further comprising one or more fastening portions extending from each of at least three edges of said first plate, and a plurality of mounting holes disposed about said one or more fastening portions,
- at least one fastening portion extending from a first edge of the first plate and effective to mount the bracket in a particular bracket orientation to a vertical structural member adjacent said first edge,
- at least one fastening portion extending from a second edge of the first plate and effective to mount the bracket in said bracket orientation to a vertical structural member adjacent said second edge, and
- at least one fastening portion extending from a third edge of the first plate and effective to mount the bracket in said bracket orientation to a horizontal element adjacent said third edge.

15. The bracket of claim 14, said horizontal element further comprising a horizontally positioned spanner bar suspended between two vertical structural members.

16. The bracket of claim 14, said bracket configured to mount electrical boxes having four side walls, a rear wall, a front opening and one or more pairs of screws projecting forward from said box generally adjacent diagonally opposite corners of said front opening, each screw having a screw head and a threaded shank,
- said first plate further comprising first and second pairs of screw receiving formations in said mounting plate generally adjacent said first and second pairs of diagonally opposite corners of each said aperture,
- said screw receiving formations configured to permit passage of said screw heads through said formations to define a first position of said electrical box relative to said mounting plate, further configured to permit lateral sliding of said screw shanks from said first position to a second position of said electrical box relative to said mounting plate, and further configured to prevent passage of said screw heads in a transverse orientation relative to said first plate from said second position.

17. The bracket of claim 14, said flexible area of attachment further comprising a first area for flexing said tab,
said at least one locking tab further comprising a second flexible area along its length that defines a second axis,
said locking tab flexible about either of said first axis, said second axis, or both of said first and second axes between said unlocked position wherein an electrical box is permitted to laterally slide from said first position to said second position, and a locked position engaging said electrical box and preventing lateral sliding from said second position to said first position.

* * * * *